(12) United States Patent
Nakamura et al.

(10) Patent No.: US 8,793,985 B2
(45) Date of Patent: Aug. 5, 2014

(54) EXHAUST EMISSION CONTROL SYSTEM FOR ENGINE

(75) Inventors: Kenichiro Nakamura, Wako (JP); Masaya Yazaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 164 days.

(21) Appl. No.: 13/403,107

(22) Filed: Feb. 23, 2012

(65) Prior Publication Data

US 2012/0227387 A1   Sep. 13, 2012

(30) Foreign Application Priority Data

Mar. 7, 2011   (JP) ................................. 2011-049619

(51) Int. Cl.
*F01N 3/10* (2006.01)
(52) U.S. Cl.
USPC ................... 60/299; 60/287; 60/292; 60/323; 60/324
(58) Field of Classification Search
USPC ............ 60/284, 287, 288, 292, 299, 323, 324
See application file for complete search history.

(56) References Cited

U.S. PATENT DOCUMENTS

| 6,003,309 | A * | 12/1999 | Agustin et al. ................... 60/276 |
| 6,397,586 | B1 * | 6/2002 | Sakurai et al. ................... 60/288 |
| 7,509,800 | B2 * | 3/2009 | I et al. ............................... 60/288 |
| 7,600,372 | B2 * | 10/2009 | Nishiumi ......................... 60/286 |
| 8,122,705 | B2 * | 2/2012 | Yasuda et al. ................... 60/285 |
| 8,176,728 | B2 * | 5/2012 | Ootake et al. ................... 60/285 |
| 8,191,354 | B2 * | 6/2012 | Cavataio et al. ................ 60/280 |

FOREIGN PATENT DOCUMENTS

| DE | 19522165 | 12/1995 |
| DE | 19500472 | 7/1996 |
| EP | 0867603 | 9/1998 |
| EP | 1122413 | 8/2001 |
| JP | 06-135467 | 5/1994 |
| JP | 06-214059 | 8/1994 |
| JP | 06-240344 | 8/1994 |
| JP | 06-241087 | 8/1994 |
| JP | 9-511811 | 11/1997 |
| JP | 2005-299529 | 10/2005 |

* cited by examiner

*Primary Examiner* — Binh Q Tran
(74) *Attorney, Agent, or Firm* — Rankin, Hill & Clark LLP

(57) ABSTRACT

An exhaust emission control system for an engine that provides both early activation of a catalyst during cold-engine, low-load operation of the engine and protection of the catalyst during hot-engine, high-load operation of the engine. The exhaust emission control system includes a catalyst provided in an intermediate portion of an exhaust pipe; an exhaust valve provided in an upstream-side exhaust passage of the exhaust pipe between the catalyst and the engine; and an auxiliary exhaust passage, which is smaller in passage cross-sectional area than the upstream-side exhaust passage and is connected to the upstream-side exhaust passage so as to bypass the exhaust valve. The auxiliary exhaust passage has an inlet connected in the vicinity of an exhaust port of the engine and an outlet connected to the vicinity of the catalyst.

20 Claims, 4 Drawing Sheets

EXHAUST EMISSION CONTROL SYSTEM FOR ENGINE

BACKGROUND OF THE INVENTION

1. Field of the Invention

The present invention relates to an exhaust emission control system for an engine that is mounted on a vehicle such as a motorcycle.

2. Description of the Related Art

Japanese Patent Laid-open No. 2005-299529 discloses a technology for contriving early activation of a catalyst, wherein an on-off valve for making variable a passage cross-sectional area is provided immediately upstream of the catalyst, and the on-off valve is closed during cold-engine operation so that an exhaust gas flows to the catalyst in a concentrated manner through a small-diameter passage oriented toward the center of the catalyst, thereby promoting a rise in the temperature of the catalyst.

In the technology disclosed in the above-mentioned Japanese Patent, in order to activate the catalyst earlier, a configuration may be contemplated in which the exhaust gas at a higher temperature is led to the catalyst by, for example, disposing the catalyst closer to an exhaust port. In that case, however, the exhaust gas at a higher temperature will flow to the catalyst during high-load operation, which is undesirable from the viewpoint of protection of the catalyst.

SUMMARY OF THE INVENTION

The present invention has been made in consideration of the above-mentioned circumstances. Accordingly, it is an object of the present invention to provide an exhaust emission control system for an engine by which both early activation of a catalyst during cold-engine, low-load operation of the engine and protection of the catalyst during hot-engine, high-load operation of the engine can be realized.

In accordance with the present invention, an exhaust emission control system for an engine is provided. The control system includes an exhaust pipe, a catalyst provided in an intermediate portion of the exhaust pipe and operative to purify an exhaust gas, an exhaust valve that is provided in an upstream-side exhaust passage of the exhaust pipe between the catalyst and an engine and by which the upstream-side exhaust passage is opened and closed, and an auxiliary exhaust passage that is smaller in passage cross-sectional area than the upstream-side exhaust passage and is connected to the upstream-side exhaust passage so as to bypass the exhaust valve. The auxiliary exhaust passage has an inlet thereof connected to the vicinity of an exhaust port of the engine and an outlet thereof is connected to the vicinity of the catalyst. The auxiliary exhaust passage is formed to be smaller in passage length in relation to the upstream-side exhaust passage.

During cold-engine, low-load operation, the exhaust valve in the upstream-side exhaust passage is closed so as to raise the pressure in the auxiliary exhaust passage and increase the bypass flow rate of the exhaust gas flowing through the auxiliary exhaust passage, whereby a high-temperature gas can be brought into contact with the catalyst and early activation of the catalyst can be achieved. On the other hand, during hot-engine, high-load operation, the exhaust valve is opened so as to increase the passage cross-sectional area of the upstream-side exhaust passage, thereby enhancing exhaust efficiency, and to decrease the flow rate of the exhaust gas flowing through the auxiliary exhaust passage. Additionally, the distance the exhaust gas passes until it reaches the catalyst is increased, whereby a rise in the temperature of the catalyst can be suppressed and the catalyst can be protected.

In further accordance with the present invention, the engine is disposed with a cylinder thereof oriented toward the vehicle front side, and the catalyst is disposed under the cylinder. Accordingly, the catalyst is disposed at a position near the cylinder, whereby the exhaust gas from the engine can be led through the auxiliary exhaust passage to the catalyst in a high-temperature state.

In further accordance with the present invention, the upstream-side exhaust passage is wound under the cylinder, and overlaps with the catalyst in side view of the engine. Therefore, the wound upstream-side exhaust passage and the catalyst overlap with each other in side view, so that a compact exhaust system can be realized.

In accordance with another aspect of the invention, an axis of the cylinder and a center axis of the catalyst are substantially parallel to each other in side view of the engine. Accordingly, external appearance can be enhanced.

According to a further aspect of the invention, the engine is disposed with a cylinder thereof oriented toward the vehicle front side, an actuator operative to drive the exhaust valve is disposed on the upper side of the cylinder, and the exhaust valve is provided in the upstream-side exhaust passage located under the cylinder. Due to this arrangement, the exhaust valve and the actuator operative to drive the exhaust valve are efficiently disposed on the upper and lower sides with respect to the cylinder, whereby space saving can be promised.

In further accordance with the invention, the auxiliary exhaust passage is formed to be smaller in diameter than the upstream-side exhaust passage. Therefore, the auxiliary exhaust passage is set smaller in diameter than the upstream-side exhaust passage, whereby the flow rate of the exhaust gas flowing through the auxiliary exhaust passage when the exhaust valve is opened can be suppressed and the protective effect on the catalyst can be enhanced.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
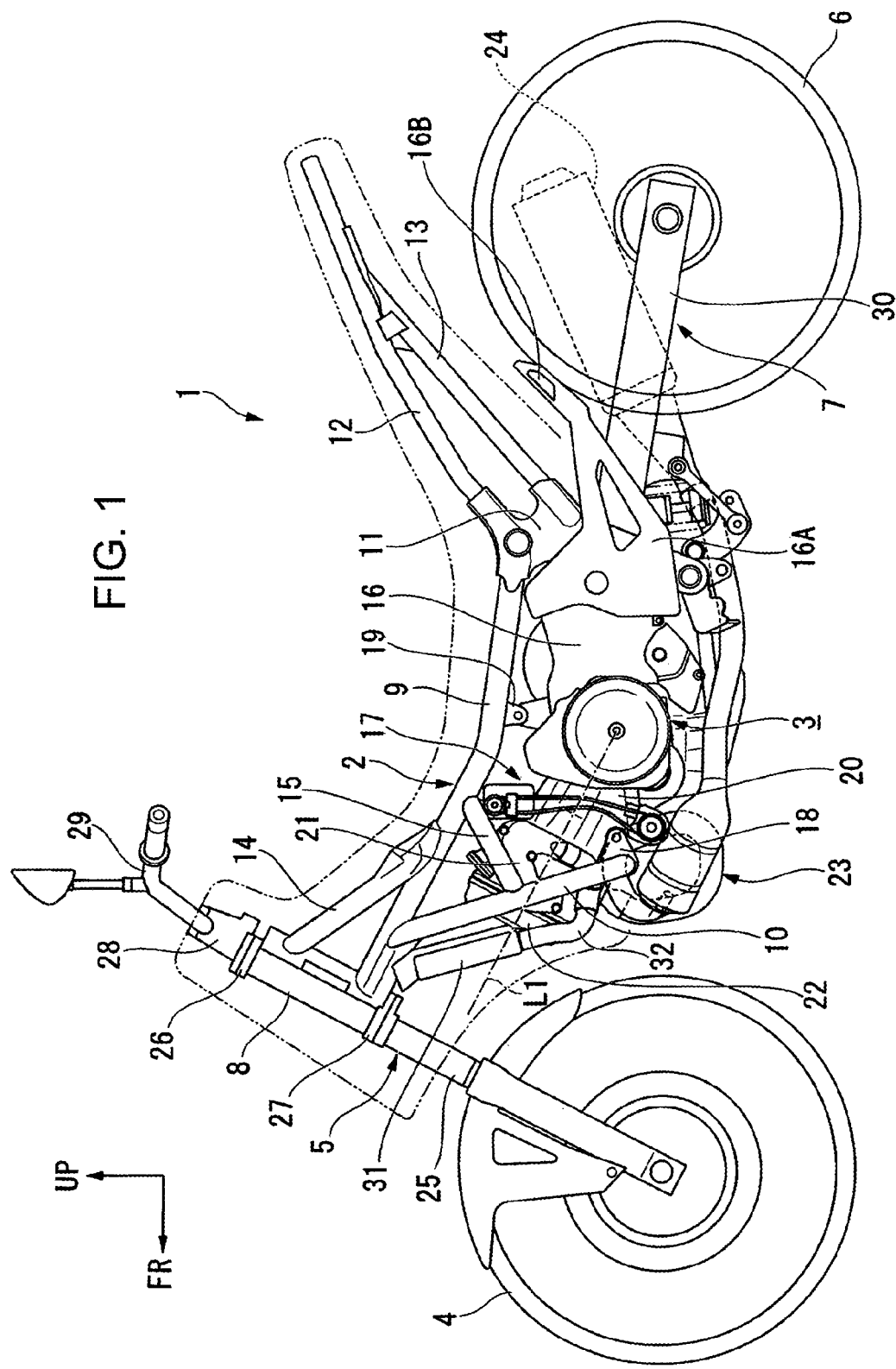
FIG. 1 is a left side view of a motorcycle on which an exhaust emission control system for an engine according to an embodiment of the present invention is mounted.

Now, an embodiment of the present invention will be described below referring to the drawings. Incidentally, in the drawings used below, arrow FR indicates the front side of the vehicle, arrow UP the upper side of the vehicle, and LH the left-hand side of the vehicle.

FIG. 1 shows a motorcycle 1 on which the system according to the present invention is mounted. The motorcycle 1 includes: a body frame 2 forming a basic skeleton of the vehicle; an engine 3 suspended on the body frame 2; a front wheel suspension device 5 that is steerably provided at a front end portion of the body frame 2 and turnably supports a front wheel 4; and a rear wheel suspension device 7 that extends rearward from the body frame 2 and turnably supports a rear wheel 6.

The body frame 2 includes: a head pipe 8 steerably supporting the front wheel suspension device 5; left and right main frames 9, 9 obliquely extending rearwardly downward from a lower portion of the head pipe 8; left and right down frames 10, 10 extending downward from front portions of the main frames 9, 9; left and right pivot frames 11, 11 extending downward from rear ends of the main frames 9, 9; left and right rear frames 12, 12 obliquely extending rearwardly downward from upper portions of the pivot frames 11, 11; and left and right rear support frames 13, 13 that are located under the rear frames 12, 12 and extend between the pivot frames 11, 11 and the rear frames 12, 12.

Between an upper portion of the head pipe 8 and the main frames 9, 9 are provided left and right upper support frames 14, 14 that extend obliquely rearwardly and downwardly. Between vertically, roughly central regions of the down frames 10, 10 and the main frames 9, 9 are provided left and right lower support frames 15, 15 that extend obliquely rearwardly and downwardly.

The front wheel suspension device 5 includes left and right front fork members 25, 25 that support the front wheel 4 at lower portions thereof; a top bridge 26 that extends between upper end portions of the front fork members 25, 25 and interconnects the front fork members 25, 25; and a bottom bridge 27 that extends between the front fork members 25, 25 on the lower side of the top bridge 26. The front wheel suspension device 5 is steerably supported on the head pipe 8. A handle holder 28 is fixed to the top bridge 26, and a handle pipe 29 as a steering handlebar is provided on the handle holder 28.

The rear wheel suspension device 7 is composed mainly of a swing arm 30, which supports the rear wheel 6 by rear portions thereof. The swing arm 30 is supported on the pivot frames 11, 11 in an upwardly and downwardly swingable manner.

The engine 3 includes a crankcase 16 and a cylinder 17 erectly provided on the crankcase 16. The engine 3 is disposed under the main frames 9, 9 so that the longitudinal direction of the crankcase 16 is set along the back-and-forth direction and the axis L1 of the cylinder 17 is obliquely oriented forwardly upward. Lower engine hangers 18, 18 are provided at lower portions of the down frames 10, 10, and the cylinder 17 is supported by the lower engine hangers 18, 18. In a back-and-forth directional region of the main frames 9, 9, upper engine hangers 19, 19 are provided which extend downward, and the crankcase 16 is supported by the upper engine hangers 19, 19 at upper portions thereof. The crankcase 16 is supported by the pivot frames 11, 11 at rear portions thereof.

Left and right side panels 16A, 16A covering the pivot frames 11, 11 on the vehicle-width-directionally outer sides are fixed to rear portions of the crank case 16. The side panels 16A, 16A obliquely extend rearwardly upward. Pillion steps 16B, 16B on which to put pillion passenger's feet are provided at the rear ends of the side panels 16A, 16A.

The cylinder 17 includes a cylinder block 20 connected to the crankcase 16, a cylinder head 21 connected to the cylinder block 20, and a head cover 22 covering the cylinder head 21. The cylinder head 21 and the head cover 22 are located between the left and right down frames 10, 10 and lower support frames 15, 15.

An exhaust pipe 23 is connected to a lower surface of the cylinder head 21, a muffler 24 is connected to the rear end of the exhaust pipe 23, and the muffler 24 is located on the right side of the rear wheel 6. A radiator 31 is disposed forwardly of the head cover 22, and a radiator hose 32 connected to a side lower surface of the radiator 31 is connected to the cylinder head 21.

Figure 2:
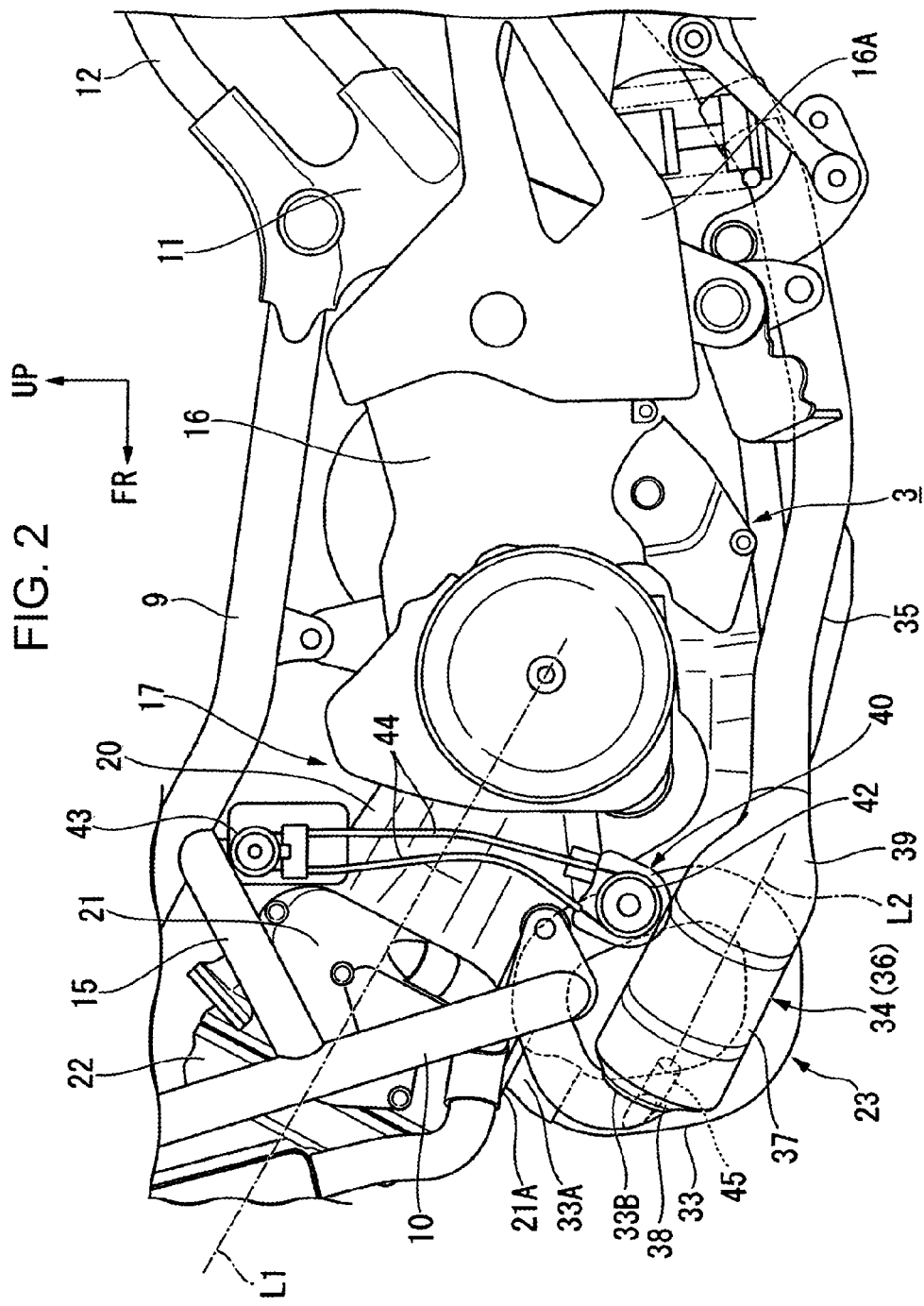
FIG. 2 is an enlarged view of a major part of FIG. 1.

As shown in FIG. 2, the exhaust pipe 23 includes an upstream-side exhaust pipe 33 connected to an exhaust port 21A formed in a lower surface of the cylinder head 21, a tubular catalyst chamber 34 connected to the upstream-side exhaust pipe 33, and a downstream-side exhaust pipe 35 connected to the catalyst chamber 34, and a catalyst 36 is contained in the catalyst chamber 34. The catalyst 36 acts for removal of hydrocarbons, carbon monoxide, nitrogen oxides, etc. present in the exhaust gas through oxidation and reduction reactions, and is configured by coating a porous honeycomb-structured body with platinum, palladium, rhodium or the like.

Figure 3:
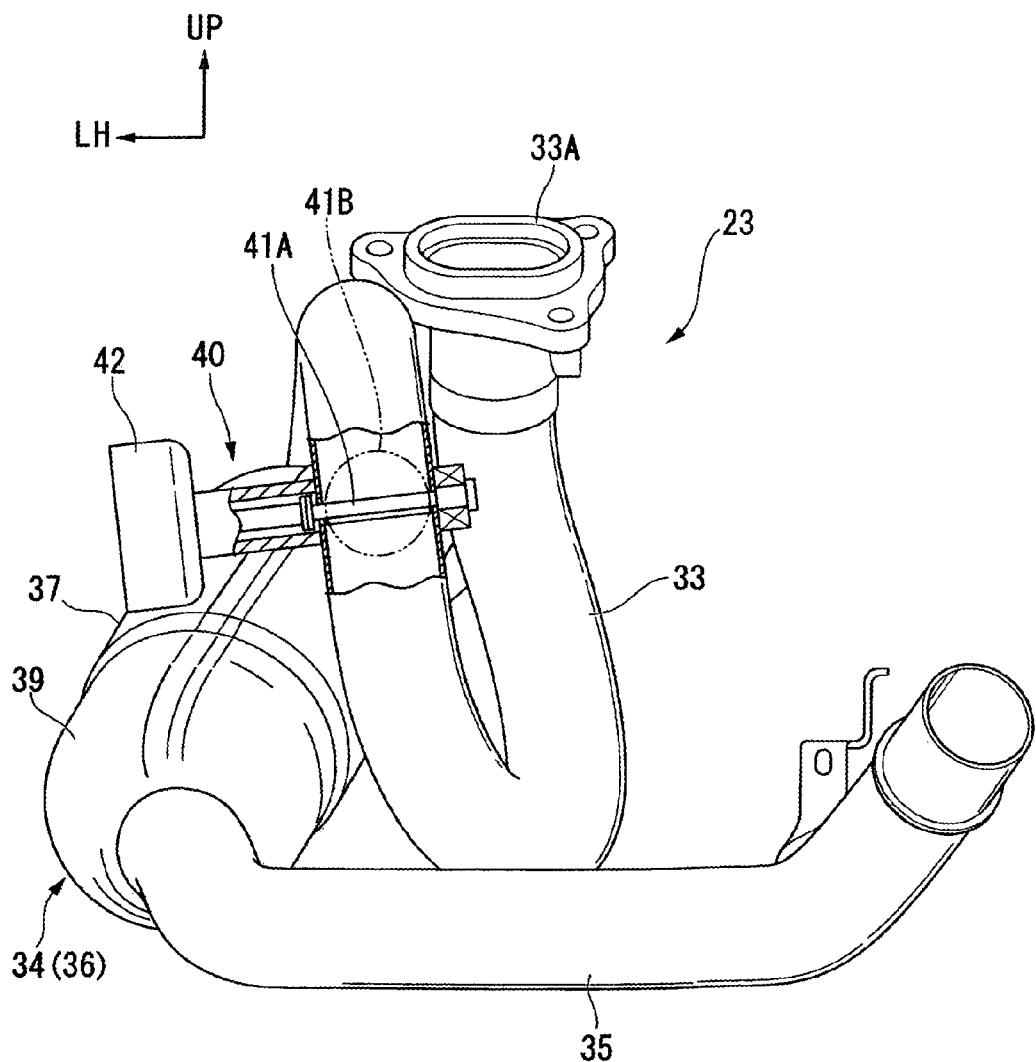
FIG. 3 is a rear view of the exhaust emission control system for a motorcycle according to the present embodiment; and, FIG. 4 is a bottom view of the exhaust emission control system for a motorcycle according to the present embodiment.
Figure 4:
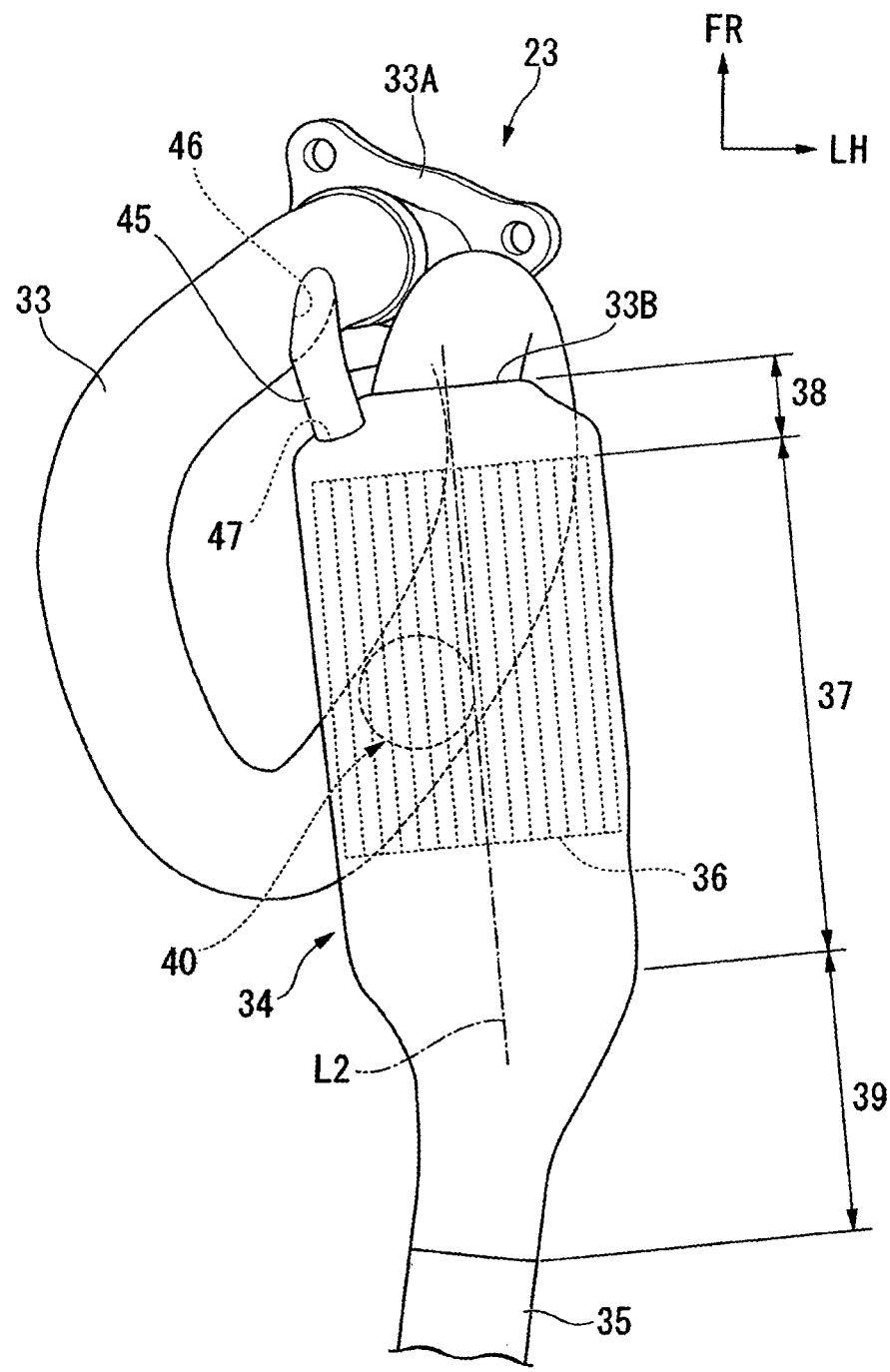

Referring to FIGS. 2 to 4, the upstream-side exhaust pipe 33 has an upstream-side end portion 33A connected to the exhaust port 21A of the cylinder head 21 and a downstream-side end portion 33B connected to the catalyst chamber 34, and is wound under the cylinder 17. More in detail, the upstream-side exhaust pipe 33 extends downward while being directed toward the vehicle-width-directionally inner side from the exhaust pipe 21A, is bent toward the rear side while being directed toward the vehicle-width-directionally outer side, then passes under the cylinder 17, is further curved, and is connected to the catalyst chamber 34, with the downstream-side end portion 33B opened to a rear lower side.

As shown in FIG. 4, the catalyst chamber 34 integrally includes a cylindrical chamber body 37 for containing the catalyst 36, a generally tapered upstream-side connection section 38 located on the upstream side of the chamber body 37 and connected to the downstream-side end portion 33B of the upstream-side exhaust pipe 33, and a generally tapered downstream-side connection section 39 located on the downstream side of the chamber body 37 and connected to the downstream-side exhaust pipe 35. The catalyst chamber 34 is disposed under the cylinder 17 in side view, as shown in FIG. 2.

The catalyst chamber 34 is so disposed that the center axis L2 of the catalyst 36 contained therein is obliquely directed rearwardly downward from the upstream-side exhaust pipe 33, with the center axis L2 of the catalyst 36 being substantially parallel to the axis L1 of the cylinder 17 in side view, and the catalyst chamber 34 extends in parallel to the cylinder 17. Further, the catalyst 36 is located so as to overlap with the upstream-side exhaust pipe 33 in side view. On the other hand, the downstream-side exhaust pipe 35 connected to the downstream-side connection section 39 of the catalyst chamber 34 is located under the crankcase 16, extends rearward across the crankcase 16, and is connected at its rear end to the muffler 24.

Referring to FIG. 2, from a position between the cylinder 17 and the catalyst chamber 34 in side view, a part of the upstream-side exhaust pipe 33 fronts on the vehicle-width-directionally outer side, and in this region an exhaust valve 40 is provided by which an exhaust passage in the upstream-side exhaust pipe 33 is opened and closed. As shown in FIG. 3, the exhaust valve 40 is a butterfly valve including: a drive shaft 41A penetrating the upstream-side exhaust pipe 33 from the vehicle-width-directionally outer side; a circular disk-like valve body 41B which is fixed to the drive shaft 41A and by which the exhaust passage inside the upstream-side exhaust pipe 33 is opened and closed; and a transmission mechanism section 42 which is connected to the drive shaft 41A on the outside of the upstream-side exhaust pipe 33 and by which the drive shaft 41A is rotated.

The transmission mechanism section 42 includes a pulley fixed to the drive shaft 41A, etc. and receives a driving force applied thereto from a drive actuator 43 disposed on the upper side of the transmission mechanism section 42 as shown in FIG. 2. The drive actuator 43 is disposed on the upper side of the cylinder 17, and is supported by an upper portion of the lower support frame 15. The exhaust valve 40 and the drive actuator 43 are located opposite to each other, with the cylinder 17 therebetween, in side view. The driving force supplied from the drive actuator 43 is transmitted through a transmission cable 44 connected between the transmission mechanism section 42 and the drive actuator 43.

When the exhaust passage in the upstream-side exhaust pipe 33 is closed by the exhaust valve 40, the exhaust gas is let flow downstream through a bypass pipe 45 provided at the upstream-side exhaust pipe 33. Referring to FIGS. 2 and 4, the upstream-side exhaust pipe 33 is integrally provided with the bypass pipe 45 constituting an auxiliary exhaust passage in the present invention that is so connected as to bypass the exhaust valve 40. The bypass pipe 45 is formed to be smaller in diameter than the upstream-side exhaust pipe 33, and has a passage cross-sectional area smaller than that of the upstream-side exhaust pipe 33.

The bypass pipe 45 has an inlet 46 connected to the upstream side of a portion of the upstream-side exhaust pipe 33 located in the vicinity of the exhaust port 21A of the engine 3, and has an outlet 47 connected to the upstream-side connection section 38 of the catalyst chamber 34. The outlet 47 of the bypass pipe 45 is slightly deviated from center axis L2 of the catalyst 36, and faces the catalyst 36 at an angle against the center axis L2. The bypass pipe 45 is formed to be shorter relative to the upstream-side exhaust pipe 33 while being connected to the latter in such a manner as to short-cut a main stream in the upstream-side exhaust pipe 33. Incidentally, the upstream-side exhaust passage in the present invention corresponds to the upstream-side exhaust pipe 33 and the upstream-side connection section 38 of the catalyst chamber 34 in the present embodiment, and the auxiliary exhaust pipe in the present invention corresponds to the bypass pipe 45 in the present embodiment.

In the engine 3 as described above, during cold-engine, low-load operation, the exhaust valve 40 in the upstream-side exhaust pipe 33 is closed so as to raise the pressure inside the bypass pipe 45, whereby the bypass flow rate of the exhaust gas flowing through the bypass pipe 45 can be increased. Therefore, it is possible to bring a high-temperature gas into contact with the catalyst 36, thereby promising early activation of the catalyst 36. On the other hand, during hot-engine, high-load operation, the exhaust valve 40 is opened so as to increase the passage cross-sectional area of the upstream-side exhaust pipe 33, thereby enhancing exhaust efficiency. This ensures that the flow rate of the exhaust gas flowing through the bypass pipe 45 is reduced, and the distance the exhaust gas passes until it reaches the catalyst 36 can be increased. Consequently, a rise in the temperature of the catalyst can be suppressed, and the catalyst 36 can be protected thereby.

Besides, in the present embodiment, the catalyst 36 is located under the cylinder 17, and the catalyst 36 is disposed near the cylinder 17, so that the exhaust gas from the engine 3 can be led through the bypass pipe 45 to the catalyst 36 in a high-temperature state. Further, the upstream-side exhaust pipe 33 is wound under the cylinder 17 and made to overlap with the catalyst 36 in side view of the engine 3, whereby a compact exhaust system can be contrived. Furthermore, the axis L1 of the cylinder 17 and the center axis L2 of the catalyst 36 are set substantially parallel to each other, whereby a feeling of unity is presented and an enhanced external appearance can be realized. In addition, the bypass pipe 45 is formed to be smaller in diameter than the upstream-side exhaust pipe 33, whereby the flow rate of the exhaust gas flowing through the bypass pipe 45 when the exhaust valve 40 is opened is suppressed, and a protective effect on the catalyst 36 is enhanced.

While an embodiment of the present invention has been described above, the invention is not restricted to the embodiment. For instance, while an example of application of the present invention to a motorcycle has been described in the above embodiment, the invention can be applied generally to saddle type vehicles on which an engine is mounted, such as motor tricycles.

Besides, while a configuration in which the upstream-side exhaust pipe 33 is wound has been described in the above embodiment, this form is not restrictive of the present invention, insofar as the passage length of the upstream-side exhaust pipe 33 is greater than the passage length of the bypass pipe 45. For example, a configuration may be adopted in which an upstream-side exhaust pipe is L-shaped and a bypass pipe interconnects end portions of the L-shaped part.

What is claimed is:

1. An exhaust emission control system for an engine, comprising an exhaust pipe, a catalyst provided in an intermediate portion of said exhaust pipe and operative to purify an exhaust gas, an exhaust valve, which is provided in an upstream-side exhaust passage of said exhaust pipe between said catalyst and an engine and by which said upstream-side exhaust passage is opened and closed, and an auxiliary exhaust passage, which is smaller in passage cross-sectional area than said upstream-side exhaust passage and is connected to said upstream-side exhaust passage so as to bypass said exhaust valve, wherein said auxiliary exhaust passage has an inlet thereof connected to the upstream-side exhaust passage in a vicinity of an exhaust port of said engine, has an outlet thereof connected to upstream-side exhaust passage in a vicinity of said catalyst, and has a first length from said inlet to said outlet;

wherein said upstream-side exhaust passage from said auxiliary exhaust passage inlet to said auxiliary exhaust passage outlet has a second length, and wherein said second length is greater than said first length.

2. The exhaust emission control system for the engine according to claim 1, wherein said engine is disposed with a cylinder thereof oriented toward the vehicle front side, and said catalyst is disposed under said cylinder.

3. The exhaust emission control system for the engine according to claim 2, wherein said upstream-side exhaust passage is wound under said cylinder, and overlaps with said catalyst in side view of said engine.

4. The exhaust emission control system for the engine according to claim 2, wherein an axis of said cylinder and a center axis of said catalyst are substantially parallel to each other in side view of said engine.

5. The exhaust emission control system for the engine according to claim 1, wherein said engine is disposed with a cylinder thereof oriented toward the vehicle front side, and an actuator operative to drive said exhaust valve is disposed on the upper side of said cylinder; and said exhaust valve is provided in said upstream-side exhaust passage located under said cylinder.

6. The exhaust emission control system for the engine according to claim 1, wherein said auxiliary exhaust passage is formed to be smaller in diameter than said upstream-side exhaust passage.

7. The exhaust emission control system for the engine according to claim 3, wherein an axis of said cylinder and a center axis of said catalyst are substantially parallel to each other in side view of said engine.

8. The exhaust emission control system for the engine according to claim 2,
wherein said engine is disposed with a cylinder thereof oriented toward the vehicle front side, and an actuator operative to drive said exhaust valve is disposed on the upper side of said cylinder; and
said exhaust valve is provided in said upstream-side exhaust passage located under said cylinder.

9. The exhaust emission control system for the engine according to claim 3,
wherein said engine is disposed with a cylinder thereof oriented toward the vehicle front side, and an actuator operative to drive said exhaust valve is disposed on the upper side of said cylinder; and
said exhaust valve is provided in said upstream-side exhaust passage located under said cylinder.

10. The exhaust emission control system for the engine according to claim 4,
wherein said engine is disposed with a cylinder thereof oriented toward the vehicle front side, and an actuator operative to drive said exhaust valve is disposed on the upper side of said cylinder; and
said exhaust valve is provided in said upstream-side exhaust passage located under said cylinder.

11. The exhaust emission control system for the engine according to claim 7,
wherein said engine is disposed with a cylinder thereof oriented toward the vehicle front side, and an actuator operative to drive said exhaust valve is disposed on the upper side of said cylinder; and
said exhaust valve is provided in said upstream-side exhaust passage located under said cylinder.

12. The exhaust emission control system for the engine according to claim 2, wherein said auxiliary exhaust passage is formed to be smaller in diameter than said upstream-side exhaust passage.

13. The exhaust emission control system for the engine according to claim 3, wherein said auxiliary exhaust passage is formed to be smaller in diameter than said upstream-side exhaust passage.

14. The exhaust emission control system for the engine according to claim 4, wherein said auxiliary exhaust passage is formed to be smaller in diameter than said upstream-side exhaust passage.

15. The exhaust emission control system for the engine according to claim 5, wherein said auxiliary exhaust passage is formed to be smaller in diameter than said upstream-side exhaust passage.

16. The exhaust emission control system for the engine according to claim 7, wherein said auxiliary exhaust passage is formed to be smaller in diameter than said upstream-side exhaust passage.

17. The exhaust emission control system for the engine according to claim 8, wherein said auxiliary exhaust passage is formed to be smaller in diameter than said upstream-side exhaust passage.

18. The exhaust emission control system for the engine according to claim 9, wherein said auxiliary exhaust passage is formed to be smaller in diameter than said upstream-side exhaust passage.

19. The exhaust emission control system for the engine according to claim 10, wherein said auxiliary exhaust passage is formed to be smaller in diameter than said upstream-side exhaust passage.

20. The exhaust emission control system for the engine according to claim 11, wherein said auxiliary exhaust passage is formed to be smaller in diameter than said upstream-side exhaust passage.

* * * * *